United States Patent
Chen et al.

(10) Patent No.: US 9,789,788 B2
(45) Date of Patent: Oct. 17, 2017

(54) METHOD AND APPARATUS FOR PRIMARY DRIVER VERIFICATION

(71) Applicant: Ford Global Technologies, LLC, Dearborn, MI (US)

(72) Inventors: Yifan Chen, Ann Arbor, MI (US); Kwaku O. Prakah-Asante, Commerce Township, MI (US); James Stewart Rankin, Novi, MI (US); Basavaraj Tonshal, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 692 days.

(21) Appl. No.: 13/744,573

(22) Filed: Jan. 18, 2013

(65) Prior Publication Data

US 2014/0207342 A1    Jul. 24, 2014

(51) Int. Cl.
   *B60N 2/02*    (2006.01)
(52) U.S. Cl.
   CPC .................. *B60N 2/0248* (2013.01)
(58) Field of Classification Search
   CPC .. B60N 2/0232; B60N 2/0244; B60N 2/0248; B60N 2/0252; B60N 2/02; B60Q 2300/112; B60R 21/013; B60R 21/0132; B60R 21/0134; B60R 21/015; B60R 2021/01516
   USPC ............................................ 701/29.6, 45, 49
   See application file for complete search history.

(56) References Cited

U.S. PATENT DOCUMENTS

| | | | |
|---|---|---|---|
| 6,028,537 A | 2/2000 | Suman et al. | |
| 6,278,772 B1 | 8/2001 | Bowater et al. | |
| 6,385,535 B2 | 5/2002 | Ohishi et al. | |
| 6,411,899 B2 | 6/2002 | Dussell | |
| 6,430,488 B1 | 8/2002 | Goldman et al. | |
| 6,438,472 B1 * | 8/2002 | Tano | G01C 21/26 701/25 |
| 6,459,969 B1 | 10/2002 | Bates et al. | |
| 6,505,780 B1 | 1/2003 | Yassin et al. | |
| 6,600,975 B2 | 7/2003 | Moriguchi et al. | |
| 6,629,033 B2 | 9/2003 | Preston et al. | |
| 6,728,349 B2 | 4/2004 | Chang et al. | |
| 6,845,251 B2 | 1/2005 | Everhart et al. | |
| 6,928,428 B1 | 8/2005 | De Vries | |
| 6,993,490 B2 | 1/2006 | Chen et al. | |
| 7,065,533 B2 | 6/2006 | Arrouye et al. | |

(Continued)

FOREIGN PATENT DOCUMENTS

EP    1969458    9/2008
GB    2470147 A * 11/2010

(Continued)

OTHER PUBLICATIONS

Search Report for German Applications 102011089349.0 (corresponding DE appln) dated Jan. 8, 2013, 7 pgs.

*Primary Examiner* — Atul Trivedi

(74) *Attorney, Agent, or Firm* — Jennifer Stec; Brooks Kushman P.C.

(57) ABSTRACT

A system includes a processor configured to examine one or more vehicle settings having been changed after a driver enters a vehicle. Also, the processor is configured to compare the examined settings to settings associated with currently stored driver profiles and verify the driver as a previously stored primary vehicle driver based at least in part on the comparison.

7 Claims, 4 Drawing Sheets

(56) References Cited

U.S. PATENT DOCUMENTS

| | | |
|---|---|---|
| 7,120,928 B2 | 10/2006 | Sheth et al. |
| 7,127,259 B2 | 10/2006 | Ueda et al. |
| 7,129,825 B2 | 10/2006 | Weber |
| 7,139,722 B2 | 11/2006 | Perrella et al. |
| 7,142,664 B2 | 11/2006 | Seligmann |
| 7,143,058 B2 | 11/2006 | Sugimoto et al. |
| 7,145,998 B1 | 12/2006 | Holder et al. |
| 7,162,237 B1 | 1/2007 | Silver et al. |
| 7,283,813 B2 | 10/2007 | Hamanaga et al. |
| 7,340,691 B2 | 3/2008 | Bassett et al. |
| 7,346,630 B2 | 3/2008 | Eichstaedt |
| 7,370,079 B2 | 5/2008 | Murata et al. |
| 7,376,226 B2 | 5/2008 | Holder et al. |
| 7,433,714 B2 | 10/2008 | Howard et al. |
| 7,444,384 B2 | 10/2008 | Horvitz |
| 7,469,827 B2 | 12/2008 | Katragadda et al. |
| 7,474,264 B2 | 1/2009 | Bolduc et al. |
| 7,535,344 B2 * | 5/2009 | Obradovich ........ H04L 61/2553 340/425.5 |
| 7,552,009 B2 | 6/2009 | Nelson |
| 7,574,195 B2 | 8/2009 | Krasner et al. |
| 7,586,956 B1 | 9/2009 | Mishra et al. |
| 7,725,480 B2 | 5/2010 | Bassett et al. |
| 7,747,246 B2 | 6/2010 | Zellner et al. |
| 7,801,283 B2 | 9/2010 | Harwood et al. |
| 7,813,950 B2 | 10/2010 | Perrella et al. |
| 7,864,029 B2 * | 1/2011 | Huang .................... B60R 25/04 340/426.1 |
| 7,889,096 B2 | 2/2011 | Breed |
| 7,917,285 B2 | 3/2011 | Rothschild |
| 7,985,911 B2 | 7/2011 | Oppenheimer |
| 8,112,720 B2 | 2/2012 | Curtis |
| 8,126,889 B2 | 2/2012 | Pitt |
| 8,223,975 B2 | 7/2012 | Marko |
| 8,233,890 B2 | 7/2012 | Zellner et al. |
| 8,301,108 B2 * | 10/2012 | Naboulsi ................ G08B 21/06 340/575 |
| 8,316,046 B2 | 11/2012 | Huang et al. |
| 2001/0037174 A1 | 11/2001 | Dickerson |
| 2002/0068583 A1 | 6/2002 | Murray |
| 2002/0107032 A1 | 8/2002 | Agness et al. |
| 2002/0143879 A1 | 10/2002 | Sommerer |
| 2003/0131023 A1 | 7/2003 | Bassett et al. |
| 2003/0212480 A1 | 11/2003 | Lutter et al. |
| 2004/0073643 A1 | 4/2004 | Hayes et al. |
| 2004/0090121 A1 | 5/2004 | Simonds et al. |
| 2004/0092253 A1 | 5/2004 | Simonds et al. |
| 2004/0093154 A1 | 5/2004 | Simonds et al. |
| 2004/0093155 A1 | 5/2004 | Simonds et al. |
| 2004/0192270 A1 | 9/2004 | Kreitzer |
| 2004/0220768 A1 | 11/2004 | Klein |
| 2004/0254715 A1 | 12/2004 | Yamada |
| 2004/0268270 A1 | 12/2004 | Hill et al. |
| 2005/0019228 A1 | 1/2005 | Myers et al. |
| 2005/0088284 A1 | 4/2005 | Zai et al. |
| 2005/0119030 A1 | 6/2005 | Bauchot et al. |
| 2005/0149520 A1 | 7/2005 | De Vries |
| 2005/0222933 A1 | 10/2005 | Wesby |
| 2006/0058948 A1 | 3/2006 | Blass et al. |
| 2006/0071804 A1 | 4/2006 | Yoshioka |
| 2006/0165015 A1 | 7/2006 | Melick et al. |
| 2006/0168627 A1 | 7/2006 | Zeinstra et al. |
| 2006/0258377 A1 * | 11/2006 | Economos ............ H04L 12/189 455/461 |
| 2006/0290490 A1 | 12/2006 | Kraus et al. |
| 2007/0004387 A1 | 1/2007 | Gadamsetty et al. |
| 2007/0016362 A1 | 1/2007 | Nelson |
| 2007/0042812 A1 | 2/2007 | Basir |
| 2007/0044037 A1 | 2/2007 | Amari et al. |
| 2007/0053513 A1 | 3/2007 | Hoffberg |
| 2007/0061067 A1 | 3/2007 | Zeinstra et al. |
| 2007/0120948 A1 | 5/2007 | Fujioka et al. |
| 2007/0140187 A1 | 6/2007 | Rokusek et al. |
| 2007/0233725 A1 | 10/2007 | Michmerhuizen et al. |
| 2007/0238491 A1 | 10/2007 | He |
| 2007/0264990 A1 | 11/2007 | Droste et al. |
| 2007/0281603 A1 | 12/2007 | Nath et al. |
| 2007/0285256 A1 | 12/2007 | Batra |
| 2007/0294304 A1 | 12/2007 | Bassett et al. |
| 2007/0299882 A1 | 12/2007 | Padgett et al. |
| 2008/0005680 A1 | 1/2008 | Greenlee |
| 2008/0036580 A1 * | 2/2008 | Breed ............... B60R 21/01536 340/438 |
| 2008/0057927 A1 | 3/2008 | Han |
| 2008/0086455 A1 | 4/2008 | Meisels et al. |
| 2008/0140488 A1 | 6/2008 | Oral et al. |
| 2008/0143497 A1 | 6/2008 | Wasson et al. |
| 2008/0150685 A1 | 6/2008 | Desai et al. |
| 2008/0159503 A1 | 7/2008 | Helbling et al. |
| 2008/0255722 A1 * | 10/2008 | McClellan ............. B60R 25/102 701/31.4 |
| 2008/0263069 A1 | 10/2008 | Harris et al. |
| 2008/0281518 A1 | 11/2008 | Dozier et al. |
| 2008/0294483 A1 | 11/2008 | Williams |
| 2008/0294663 A1 | 11/2008 | Heinley et al. |
| 2008/0319653 A1 | 12/2008 | Moshfeghi |
| 2008/0319665 A1 | 12/2008 | Berkobin et al. |
| 2009/0002145 A1 | 1/2009 | Berry et al. |
| 2009/0005966 A1 | 1/2009 | McGray et al. |
| 2009/0011799 A1 | 1/2009 | Douthitt et al. |
| 2009/0056525 A1 | 3/2009 | Oppenheimer |
| 2009/0074168 A1 | 3/2009 | Henry |
| 2009/0075624 A1 | 3/2009 | Cox et al. |
| 2009/0094088 A1 | 4/2009 | Chen et al. |
| 2009/0111422 A1 | 4/2009 | Bremer et al. |
| 2009/0112608 A1 | 4/2009 | Abu-Hakima et al. |
| 2009/0144622 A1 | 6/2009 | Evans et al. |
| 2009/0157615 A1 | 6/2009 | Ross et al. |
| 2009/0157717 A1 | 6/2009 | Palahnuk et al. |
| 2009/0158200 A1 | 6/2009 | Palahnuk et al. |
| 2009/0193149 A1 | 7/2009 | Khosravy |
| 2009/0248285 A1 | 10/2009 | Baur |
| 2009/0267757 A1 | 10/2009 | Nguyen |
| 2009/0284359 A1 * | 11/2009 | Huang .................... B60R 25/04 340/426.1 |
| 2009/0312901 A1 | 12/2009 | Miller et al. |
| 2010/0017543 A1 | 1/2010 | Preston et al. |
| 2010/0062714 A1 | 3/2010 | Ozaki |
| 2010/0086112 A1 | 4/2010 | Jiang et al. |
| 2010/0087987 A1 * | 4/2010 | Huang .................... B60W 40/08 701/36 |
| 2010/0125801 A1 | 5/2010 | Shin |
| 2010/0136944 A1 | 6/2010 | Taylor et al. |
| 2010/0148920 A1 | 6/2010 | Philmon et al. |
| 2010/0152950 A1 * | 6/2010 | Chin .................... B60W 40/09 701/31.4 |
| 2010/0159964 A1 | 6/2010 | Ferro |
| 2010/0169432 A1 | 7/2010 | Santori, Jr. et al. |
| 2010/0209881 A1 * | 8/2010 | Lin ...................... G09B 19/167 434/65 |
| 2010/0209882 A1 * | 8/2010 | Lin ...................... G09B 19/167 434/65 |
| 2010/0209892 A1 * | 8/2010 | Lin ...................... G09B 19/167 434/71 |
| 2010/0210302 A1 | 8/2010 | Santori et al. |
| 2010/0227629 A1 | 9/2010 | Cook et al. |
| 2010/0228803 A1 | 9/2010 | Quinn |
| 2010/0233957 A1 | 9/2010 | Dobosz |
| 2010/0235891 A1 | 9/2010 | Oglesbee et al. |
| 2010/0274689 A1 | 10/2010 | Hammad et al. |
| 2010/0274865 A1 | 10/2010 | Frazier et al. |
| 2010/0287024 A1 | 11/2010 | Ward et al. |
| 2010/0323657 A1 | 12/2010 | Barnard et al. |
| 2010/0330975 A1 | 12/2010 | Basir |
| 2011/0021234 A1 | 1/2011 | Tibbitts et al. |
| 2011/0039581 A1 | 2/2011 | Cai et al. |
| 2011/0040707 A1 | 2/2011 | Theisen et al. |
| 2011/0045810 A1 | 2/2011 | Issa et al. |
| 2011/0072492 A1 | 3/2011 | Mohler et al. |
| 2011/0087705 A1 | 4/2011 | Swink et al. |
| 2011/0121991 A1 | 5/2011 | Basir |
| 2011/0137520 A1 | 6/2011 | Rector et al. |
| 2011/0137773 A1 | 6/2011 | Davis, III et al. |

(56) References Cited

U.S. PATENT DOCUMENTS

| | | | |
|---|---|---|---|
| 2011/0144980 A1 | 6/2011 | Rysenga | |
| 2011/0176670 A1 | 7/2011 | Kaplan et al. | |
| 2011/0257881 A1 | 10/2011 | Chen et al. | |
| 2011/0289522 A1 | 11/2011 | Pontual et al. | |
| 2011/0298924 A1 | 12/2011 | Miller et al. | |
| 2011/0300843 A1 | 12/2011 | Miller et al. | |
| 2011/0300884 A1 | 12/2011 | Ollila et al. | |
| 2012/0010805 A1 | 1/2012 | Wilkerson | |
| 2012/0041633 A1 | 2/2012 | Schunder et al. | |
| 2012/0044089 A1 | 2/2012 | Yarnold et al. | |
| 2012/0050028 A1 | 3/2012 | Mastronardi et al. | |
| 2012/0053793 A1* | 3/2012 | Sala | B60N 2/0244 701/45 |
| 2012/0130953 A1 | 5/2012 | Hind et al. | |
| 2012/0149441 A1 | 6/2012 | Saito et al. | |
| 2012/0158658 A1 | 6/2012 | Wilkerson | |
| 2012/0158918 A1 | 6/2012 | LeBlanc et al. | |
| 2012/0172009 A1 | 7/2012 | Wilkerson | |
| 2012/0202525 A1 | 8/2012 | Pettini | |
| 2012/0225677 A1 | 9/2012 | Forstall et al. | |
| 2012/0271676 A1 | 10/2012 | Aravamudan et al. | |
| 2012/0272176 A1 | 10/2012 | Nielsen et al. | |
| 2013/0024109 A1 | 1/2013 | Hosotani et al. | |
| 2013/0124085 A1 | 5/2013 | Mochizuki et al. | |

FOREIGN PATENT DOCUMENTS

| | | |
|---|---|---|
| JP | 2007205872 | 8/2007 |
| JP | 2008172820 | 7/2008 |
| WO | 03107129 | 12/2003 |
| WO | 2011016886 | 2/2011 |

\* cited by examiner

METHOD AND APPARATUS FOR PRIMARY DRIVER VERIFICATION

TECHNICAL FIELD

The illustrative embodiments generally relate to a method and apparatus for primary driver verification.

BACKGROUND

Modern vehicle technologies offer unprecedented opportunities for customization. For instance, drivers can set their preferred seating positions, lumbar support, and steering wheel tilts, not to mention ever increasing on-board infotainment features ranging from center stack/cluster display appearance and radio station presets to the adaptive cruise control gap and lane-keeping aid sensitivity. The concept of customization can also be extended to information services and delivery, ranging from customized news coverage and music play lists to traffic information tailored to frequently visited POI (Points of Interest). While some of the features can be set once and remain valid for a long period of time, such as infotainment system's unit of measure (e.g., metric vs. English), others require frequent updates because of various changing factors.

One of the very important such factors is the driver. If the vehicle knows who is driving, it would be possible to tailor the vehicle seamlessly to the driver preferences.

SUMMARY

In a first illustrative embodiment, a system includes a processor configured to examine one or more vehicle settings having been changed after a driver enters a vehicle. Also, the processor is configured to compare the examined settings to settings associated with currently stored driver profiles and verify the driver as a previously stored primary vehicle driver based at least in part on the comparison.

In a second illustrative embodiment, a computer-implemented method includes examining one or more vehicle settings having been changed after a driver enters a vehicle. The method also includes comparing the examined settings to settings associated with currently stored driver profiles and verifying the driver as a previously stored primary vehicle driver based at least in part on the comparison.

In a third illustrative embodiment, a non-transitory computer-readable storage medium stores instructions that, when executed by a processor, cause the processor to perform the method including examining one or more vehicle settings having been changed after a driver enters a vehicle. The method also includes comparing the examined settings to settings associated with currently stored driver profiles and verifying the driver as a previously stored primary vehicle driver based at least in part on the comparison.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
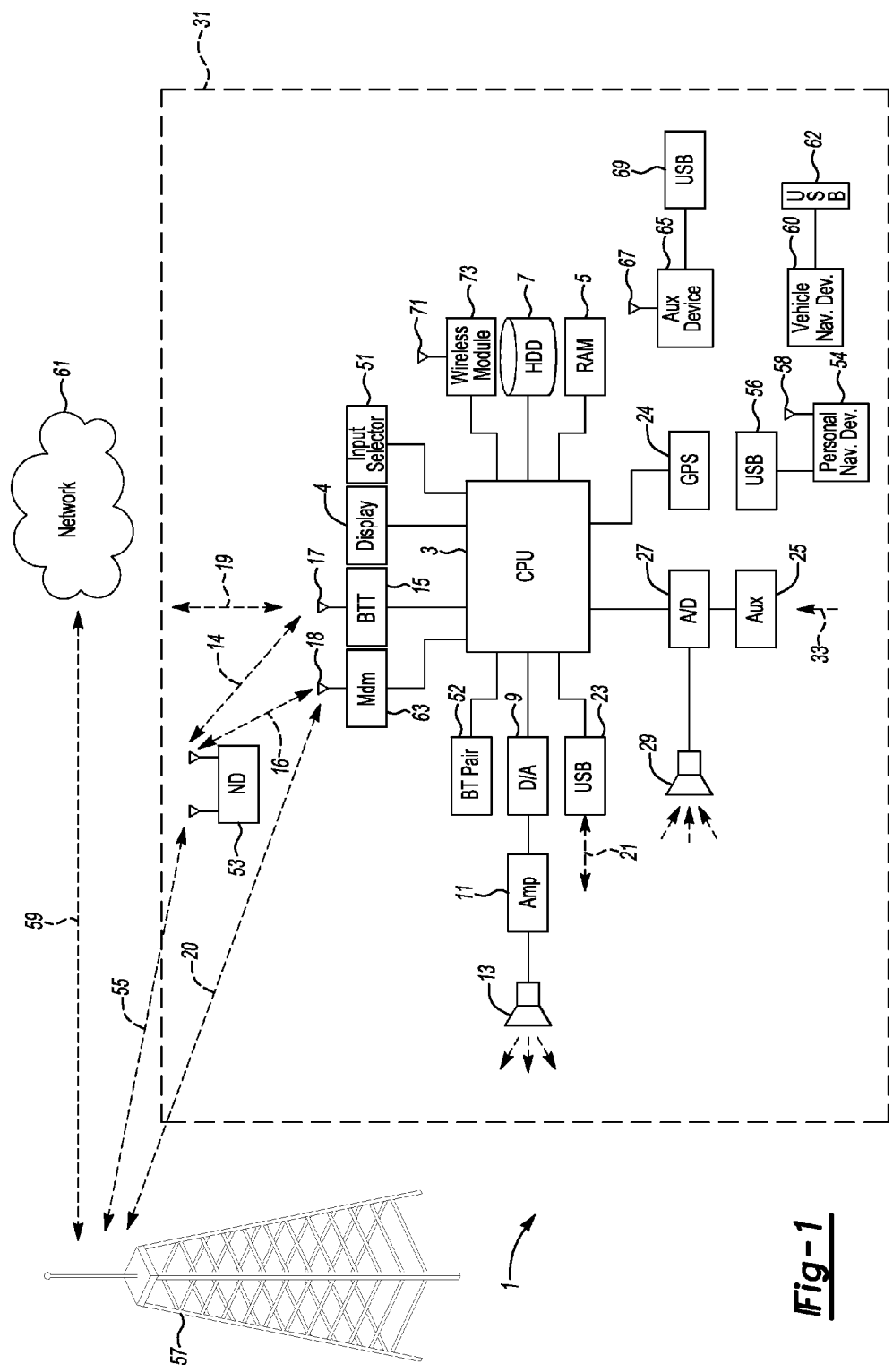
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Modern vehicle technologies offer unprecedented opportunities for customization. For instance, drivers can set their preferred seating positions, lumbar support, steering wheel tilts, center/stack cluster appearance, radio station presets, adaptive cruise control gap, lane-keeping aid sensitivity, etc. Customization can also be extended to information services and delivery, ranging from customized news coverage and music play lists to traffic information tailored to frequently visited points of interest (POIs). While some of the features can be set once and remain valid for a long period of time, others may require frequent changes due to various changing factors.

One common "changing factor" is the vehicle driver. If the vehicle knows who is driving, it would be possible to tailor the vehicle seamlessly to the driver preferences. For instance, as soon as the driver sits down in the vehicle and starts the engine, the vehicle could adjust the seat position, pedal positions, steering wheel tilt, climate control settings, driving mode, radio station presets, etc., based on registered driver preferences. In such a case, the driver may not even need to press a button or enter a request for settings changes, the vehicle "knows" who is driving and prepares the environment as the driver prefers.

When a vehicle is first delivered to a customer, the driver can be asked a few questions in an initialization phase. These can include, for example, whether or not to store presets and preferences, and for a profile name. The profile will correspond to a default driver.

In one embodiment, the vehicle will have one or more "primary" drivers. These include people who commonly use the vehicle. The vehicle also may have one or more secondary drivers, which correspond to people who may, for example, occasionally borrow the vehicle. In this example, the vehicle is able to use the illustrative embodiments to verify a member of the primary group and provide settings based on that verification.

After an initialization phase, data can be collected continuously during the usage of the vehicle for development of user profiles. This data can not only be used to set the vehicle to the desired preferences when a driver is verified, but the data itself can be used to verify a driver, as shown in the illustrative embodiments. Data can include, but is not limited to, seat positions, steering wheel tilt, mirror positions, pedal positions, driver weight, climate control settings, climate control settings, radio station tuning, route selection, operation data, shifting styles, driver voice signature, facial images, GPS data (preferences, predictions, etc.), driver smartphone controls, etc.

Figure 2:
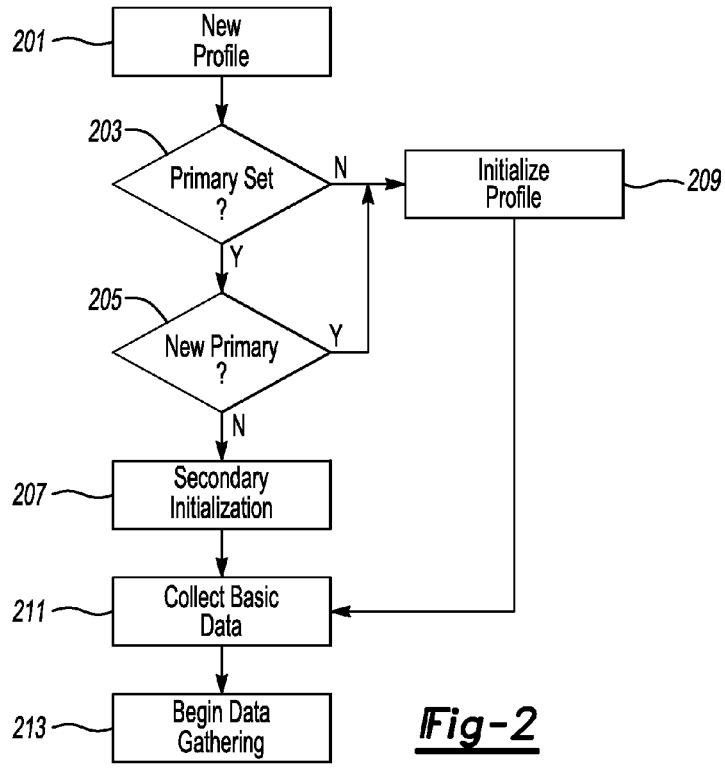
FIG. 2 shows an illustrative process for driver profile creation.

FIG. 2 shows an illustrative process for driver profile creation. In this example, a new driver may be added to the vehicle. If a driver profile doesn't exist, or if the driver isn't recognized by the vehicle (after a certain measure of analysis, for example), the process may attempt to create a new profile 201.

First, in this example, the process queries the driver to determine if the present driver is a primary driver of the vehicle. The driver doesn't necessarily need to benefit from the vehicle remembering setting information. In this illustrative example, the process determines if there is any primary driver set at all 203. If there isn't, the process initiates a user profile 209. Similarly, even if there is a primary driver, the process asks if the driver is an additional primary driver 205. If so, the process also initiates a profile for the new primary driver.

If the driver is not a primary driver, the process may gather data for a secondary driver 207. In this example, if a secondary driver is using the vehicle, the process may provide a "common" set of interfaces and vehicle environmental settings. Since the settings are for general use by vehicle borrowers, the process may gather data from secondary drivers to provide a secondary profile that is representative of the aggregate choices of secondary users. In another example, the process may simply provide a factory preset secondary setting, for example.

In the event of a primary (or in this case, secondary) driver, the process may collect some basic data about the driver 211. This can be as simple as asking the driver to provide a profile identification. It could also include, for example, recording seat weight sensor data, recording facial profile data, etc. This could be especially useful with respect to primary drivers.

Once any initialization data has been gathered, the process may begin data gathering 213, to record information based on what the driver enters/changes during a trip.

Figure 3:
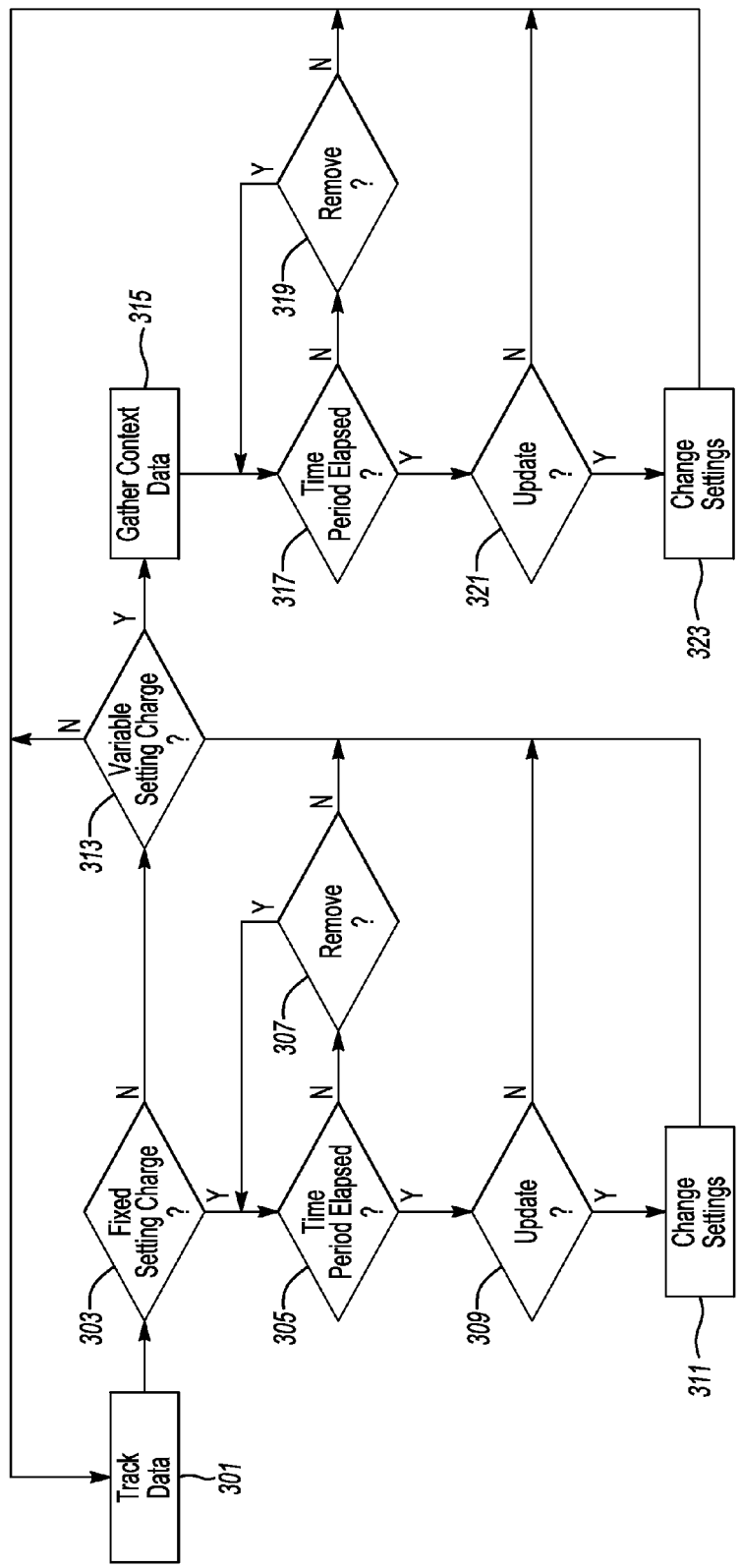
FIG. 3 shows an illustrative process for data collection and updating.

FIG. 3 shows an illustrative process for data collection and updating. As previously mentioned, the processes described herein may gather and adjust vehicle settings to a variety of driver-preferred standards. Since this data may change over time, even for a particular driver, the process may need to track changes in the data. In this example, both "fixed" and variable settings are considered.

The fixed settings are not technically "fixed," but are settings that are typically left alone once set. These include, but are not limited to, seat settings, mirror settings, radio presets, etc. The variable settings, on the other hand, correspond to things that commonly change over a drive, such as radio volume, temperature settings, etc. Even if these variables commonly change over a drive, they may have typical settings in the average, or may change in a predictable manner.

Once data tracking has begun 301, the process determines if a change has been detected to a fixed setting 303 or a variable setting 313. If no discernible change has been made to either setting, the process will continue to monitor for changes to either setting type.

If a change to a fixed setting, for example, has been detected 303, the process determines if a time period of some predetermined amount has elapsed 305. Since the setting could have been briefly changed, or the change could be detected during the process of changing the setting (but the setting having not yet reached a final setting), the process may not record/register a detected change until after a predetermined time period has passed.

While the time is passing, the process may also determine if the detected change remains 307. In this manner, if the process detects a change in progress, but that has not reached a final setting, then the change (to the intermediate setting) should not remain over the pre-determined period of time. Accordingly, until the change reaches a setting for which it remains for some period of time, the process will ignore the intermediate changes and continue to look for a finalization of the change.

If the change has remained for the predetermined period of time, the process has to determine whether or not to update the setting 309. This could be a decision of the vehicle system itself, or it could be a result of asking a driver if the new setting should be saved to replace the old setting. If the update has been requested/decided on, the process will change the setting 311. In some cases, the process may determine that an aggregate setting should be used, in other cases the process can merely adopt the new setting.

In another case, the process determines if a variable setting (such as volume) has changed. Variable settings are often affected by vehicle/environmental context. For example, a loud environment could cause a user to increase radio volume. A cold environment could cause a user to increase temperature. Since the context may have bearing on the variable, the process may track and even record the context so that the vehicle can apply certain changes based on correspondences to environment.

Once context data has been gathered (either generally all available context data, or data relating to the changed variable), the process again attempts to determine if a predetermined time period has elapsed 317. As with the fixed settings, it may only be desirable to record a change in data if some time period has elapsed, although the time period may be different for the fixed versus variable settings. If the time period has not elapsed, and the setting still remains 319, the process continues waiting for the predetermined amount of time to elapse. If, however, the setting changes, before the time is up, the process continues monitoring for changes to a setting.

As with the fixed settings, if the time period elapses and the setting has been maintained, the process must decide whether an update is in order. If the update is appropriate, the process will update the settings and make any adjustments to context variables associated with those settings. Context variables can also be associated with fixed settings, although it is more likely that they will be associated with these variable settings, since these are elements that commonly change over the course of a journey, often in reaction to an environmental event.

Figure 4:
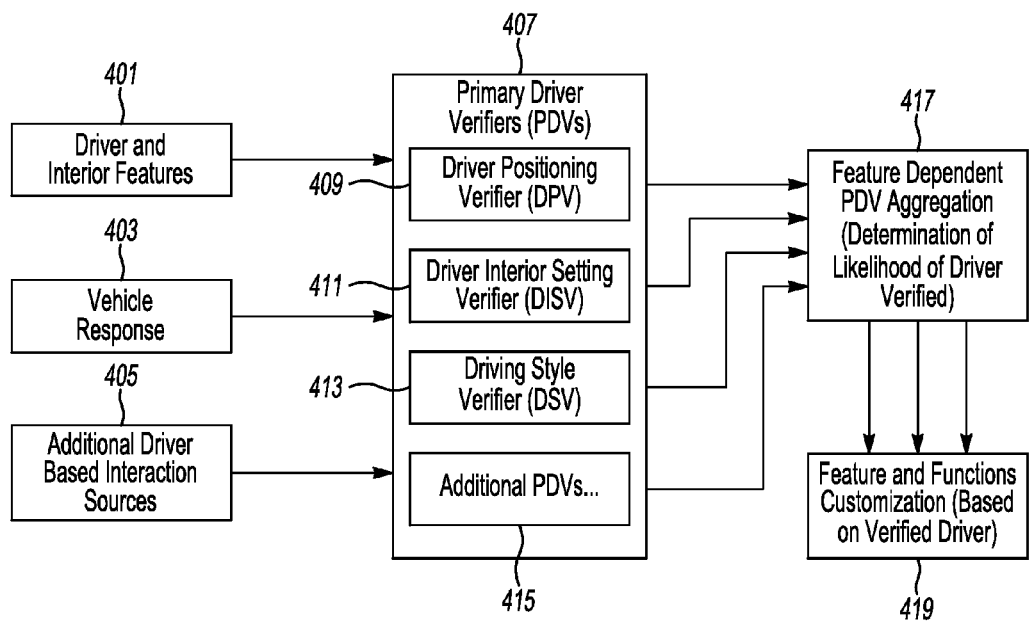
FIG. 4 shows an illustrative process for driver verification.

FIG. 4 shows an illustrative process for driver verification. In this illustrative example, the process describes a primary driver verification system (PDVS) 407. The PDVS tracks the driver interaction with interior features, settings, vehicle preferences and verifies who the driver is based on one or more decision systems and/or algorithms.

Once the driver has been verified, the PDVS can set vehicle preferences with a relative degree of confidence. The PDVS consists of a number of primary driver verifiers PDVs. The PDVs are collected from a number of information services, such as, but not limited to, driver and interior features 401, vehicle response 403, additional driver based information sources 405, etc.

Example PDVs include, but are not limited to Driver Positioning Verifier (DPV) 409, Driver Interior Setting Verifier (DISV) 411, Driver Style Verifier (DSV) 413, etc. 415. These PDVs are based on data gathered from the numerous vehicle systems and feedback processes provided to the vehicle. Any point where the driver interacts with the vehicle, data can be gathered and used for driver verification if appropriate.

The output (or settings of) the various PDVs aggregate to determine which of the primary drivers are operating the vehicle 417. In some cases, depending on the number of drivers and inputs, the aggregation determination could be determined after only one or two variable inputs. If, for example, there were only two drivers of a vehicle, there are likely a number of easily discernible differences. On the other hand, if the two drives were twins of relatively similar weights, for example, the process may require more inputs to determine which of the twins is driving at a given time.

Once a particular driver has been verified, the process can then proceed with feature and function customization based on the preferences of the verified driver. The process can also monitor and update changes to fixed or variable settings.

Figure 5:
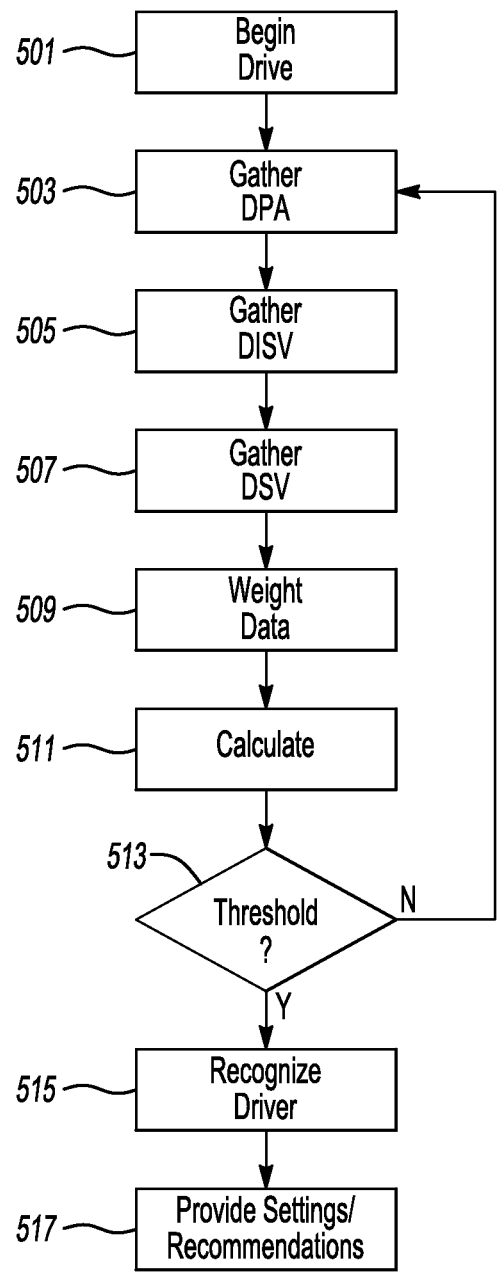
FIG. 5 shows another illustrative process for driver verification.

FIG. 5 shows another illustrative process for driver verification. This process describes in greater detail one exemplary manner for verifying a driver. In this example, the process uses one or more DPV inputs such as, but not limited to, memory seat positions, steering wheel tilt, mirror positions, pedal positions, etc. Once a drive has begun, the process can gather and analyze data 501. Once the drive has begun 501, it is assumed that the seats and mirrors are likely in the proper position to use one or more of these as driver verification data points.

In one example, a seat position could be used as an example for driver verification. For example, over a period of time, it could be observed that driver A has a mean seat position of 30 cm with a standard deviation of 2 cm, while driver B has a mean seat position of 40 cm with a standard deviation of 1.5 cm. Similar likelihood and frequency distribution data may be computed for additional DPVs. The likelihood of various DPVs for a particular driver can be combined to provide a DPV input component to a verification equation 503.

Another source of verification data may include driver interior setting verifiers (DISVs). These examples include, for instance, climate control settings, radio station tuning, etc. For example, if climate temperature targets were used for verification, climate target setting data and probability data may be gathered 505. This can be compared to data gathered over a number of drive cycles.

For example, driver A may have a mean target setting of 70 degrees with a standard deviation of 2 degrees, and driver B may have a mean target setting of 68 degrees with a standard deviation of 3 degrees.

Yet another piece/pieces of usable information may include driving style verifiers (DSVs). These can be gathered 507 based on observed driving behavior, such as braking habits, acceleration habits, etc. For any given feature, the feature dependent PDV aggregation to obtain the overall likelihood of a verified driver may be given by:

$$PDV_j = \frac{\sum_{i=1}^{N} w_i y_i}{\sum_{i=1}^{N} w_i}$$

Where:
j=number of drivers to verify (e.g., number of primary drivers);
$PDV_j$=the aggregated likelihood of a driver verified value (0-1)
N=the number of PDVs
$y_i$=PDV values for a potential driver
$w_i$=weight attributed to each PDV indicator For example, using the exemplary PDVs described herein, DPV, DISV and DSV, along with 2-stage driver verification (A,B; where A and B are the potential drivers), the likelihood of the driver being driver A is given by:

$$PDV_A = \frac{DPV_A w_{DPV} + DISV_A w_{DISV} + DSV_A w_{DSV}}{w_{DPV} + w_{DISV} + w_{DSV}}$$

and the likelihood of the driver being driver B is given by:

$$PDV_B = \frac{DPV_B w_{DPV} + DISV_B w_{DISV} + DSV_B w_{DSV}}{w_{DPV} + w_{DISV} + w_{DSV}}$$

When a tunable minimum PDV threshold is achieved, the particular driver can be verified based on the highest PDV value. Feature, function settings and recommendations are then provided based on the verified driver. The illustrative embodiments can modify a number of vehicle settings and HMI settings, including, but not limited to, HMI displays (radio presets, for example), physical system settings (seat/wheel/mirror presets), airbag deployment pressure, adaptive vehicle modes, climate controls, etc.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A system comprising:
a processor configured to:
record data relating to drive style after a vehicle is in motion;
compare the drive style to drive styles associated with currently stored driver profiles; and
verify the driver as a previously stored primary vehicle driver based at least in part on the comparison.

2. The system of claim 1, wherein the processor is further configured to repeat the examining and comparing until a likelihood of a given driver exceeds a predetermined threshold.

3. The system of claim 1, wherein the processor is further configured to tailor features and functions of HMI displays, vehicle physical system settings, adaptive vehicle modes, and climate controls based on the verified driver.

4. A computer-implemented method comprising:
recording data relating to drive style after a vehicle is in motion;
comparing the drive style to drive styles associated with currently stored driver profiles, via a vehicle-associated computer; and
verifying the driver as a previously stored primary vehicle driver based at least in part on the comparison.

5. The method of claim 4, wherein the method further includes repeating the examining and comparing until a likelihood of a given driver exceeds a predetermined threshold.

6. A non-transitory computer-readable storage medium storing instructions that, when executed by a processor, cause the processor to perform the method comprising:
recording data relating to drive style after a vehicle is in motion;
comparing the drive style to drive styles associated with currently stored driver profiles; and
verifying the driver as a previously stored primary vehicle driver based at least in part on the comparison.

7. The storage medium of claim 6, wherein the method further includes repeating the examining and comparing until a likelihood of a given driver exceeds a predetermined threshold.

* * * * *